(12) United States Patent
Schultheis et al.

(10) Patent No.: US 8,657,146 B2
(45) Date of Patent: Feb. 25, 2014

(54) OPTIMIZED HIGH PRESSURE VESSEL

(75) Inventors: Valentin Schultheis, Darmstadt (DE); Philip Klaus, Heidesheim (DE); Dieter Hasenauer, Weinheim (DE); Ulrich Eberle, Remseck (DE); Andre Mack-Gardner, Daisbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 477 days.

(21) Appl. No.: 12/708,719

(22) Filed: Feb. 19, 2010

(65) Prior Publication Data

US 2011/0204061 A1    Aug. 25, 2011

(51) Int. Cl.
 *F17C 1/00*    (2006.01)
(52) U.S. Cl.
 USPC ........... 220/586; 220/581; 220/592; 220/601; 220/651; 206/0.6; 206/0.7

(58) Field of Classification Search
 USPC ........... 220/581, 586, 592, 601, 651; 206/0.6, 206/0.7
 See application file for complete search history.

(56) References Cited

U.S. PATENT DOCUMENTS

| | | | | |
|---|---|---|---|---|
| 4,667,815 | A | * | 5/1987 | Halene ........................... 206/0.7 |
| 2003/0111473 | A1 | * | 6/2003 | Carter et al. .................. 220/586 |
| 2008/0251055 | A1 | * | 10/2008 | Schmalz et al. ............... 123/519 |
| 2009/0255831 | A1 | * | 10/2009 | Zimmermann ................... 206/7 |

\* cited by examiner

*Primary Examiner* — Anthony Stashick
*Assistant Examiner* — Elizabeth Volz
(74) *Attorney, Agent, or Firm* — Fraser Clemens Martin & Miller LLC; J. Douglas Miller

(57) ABSTRACT

A vessel is disclosed, the vessel including a main body having a hollow interior for receiving a fluid therein, wherein at least a portion of the hollow interior includes a filling material disposed therein to minimize a rate of flow of the fluid from the main body, wherein the filling material is at least one of a porous structured material and a granulate material.

20 Claims, 1 Drawing Sheet

OPTIMIZED HIGH PRESSURE VESSEL

FIELD OF THE INVENTION

The invention relates to a vessel and more particularly to a high pressure vessel, the vessel including a main body defining a hollow interior, wherein at least a portion of the hollow interior includes a filling material disposed therein.

BACKGROUND OF THE INVENTION

Presently, there are a variety of vessels designed to contain various fluids such as compressed natural gas (CNG), hydrogen gas for use in a fuel cell, and the like, for example. A common technique for storing the fluid is in a lightweight, high pressure vessel. High pressure vessels and methods of manufacture thereof are well known in the prior art. Typically, the high pressure vessel is formed using a conventional forming process such as a welding process, a rotational molding process, an injection blow molding process, and any combination thereof, for example. One type of high pressure vessel is formed by wrapping a fiber reinforced plastic around a thin, hollow main body or liner. The liner, typically, is produced from a plastic or metal material, for example.

When high pressure vessels are utilized in fuel cell vehicles, it is desirable that the high pressure vessels be impact resistant. It is also desirable that the high pressure vessels are produced with energy mitigating properties in case of a sudden release of pressure therefrom.

It would be desirable to develop a high pressure vessel including a filling material disposed therein, wherein an energy during a sudden release of pressure is effectively dissipated.

SUMMARY OF THE INVENTION

In accordance and congruent with the present invention, a high pressure vessel including a filling material disposed therein, wherein an energy during a sudden release of pressure is effectively dissipated, has surprisingly been discovered.

In one embodiment, the vessel comprises: a main body defining a hollow interior for receiving a fluid therein; and a filling material disposed in the hollow interior of the main body to minimize a rate of flow of the fluid from the main body.

In another embodiment, the vessel comprises: a main body defining a hollow interior for receiving a pressurized fluid therein, the main body having at least one neck finish formed therein to form an opening into the hollow interior of the main body; a filling material disposed in the hollow interior of the main body to minimize a rate of flow of the pressurized fluid from the main body; and an outer shell formed around the main body.

In another embodiment, the vessel comprises: a main body defining a hollow interior for receiving a pressurized fluid therein, the main body having at least one neck finish formed therein to form an opening into the hollow interior of the main body, wherein the at least one neck finish receives a vessel penetration element therein; an outer shell formed around the main body; and a filling material disposed in at least a portion of the hollow interior of the main body to minimize a rate of flow of the pressurized fluid through an undesired opening formed in at least one of the main body and the outer shell.

DESCRIPTION OF THE DRAWINGS

The above, as well as other features of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
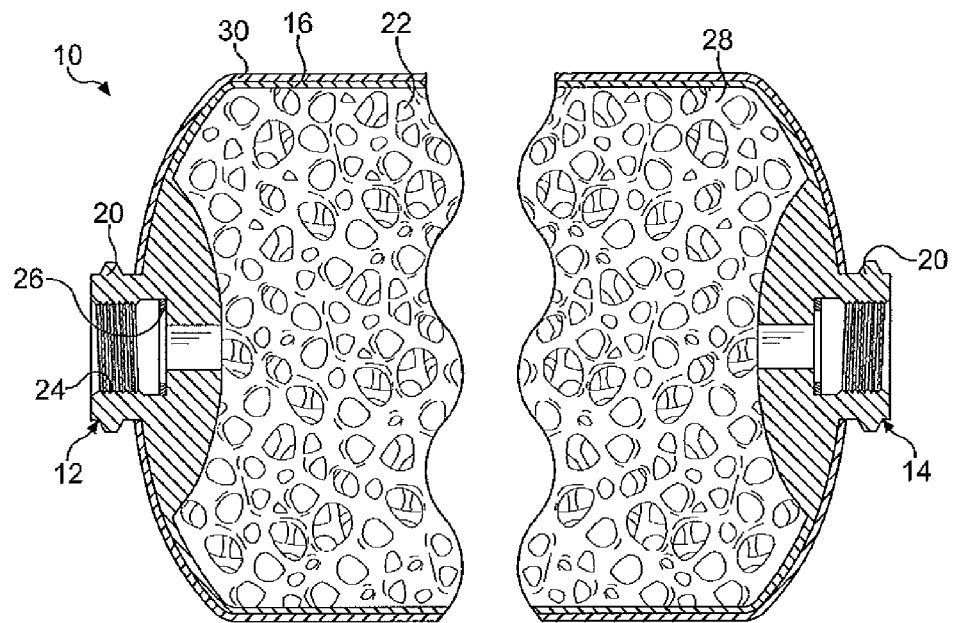
FIG. 1 is a fragmentary cross-sectional elevational view of a vessel having a filling material disposed therein according to an embodiment of the invention, wherein the filling material is a porous structured material.
Figure 2:
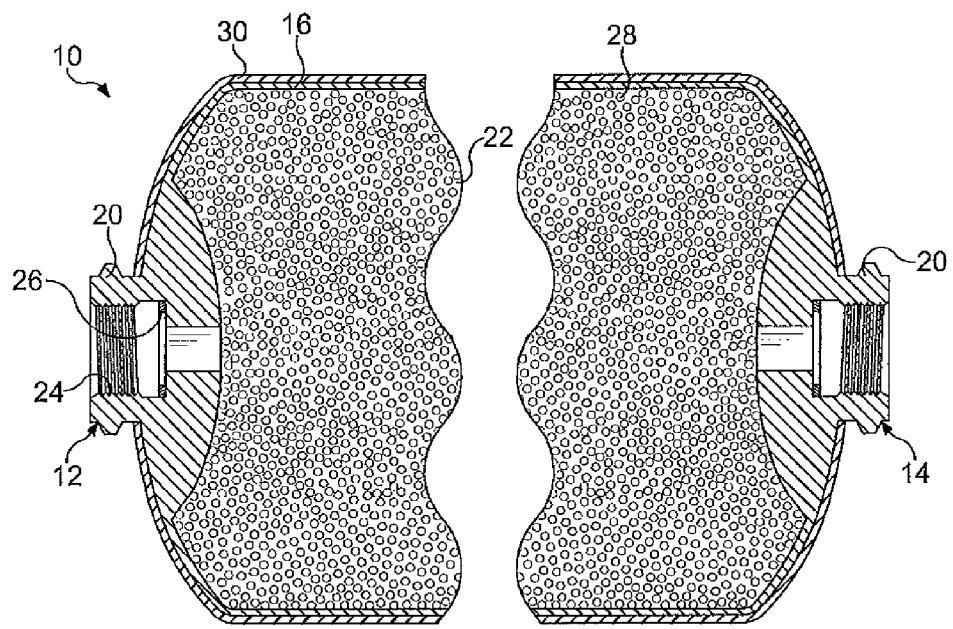
FIG. 2 is a fragmentary cross-sectional elevational view of the vessel illustrated in FIG. 1, wherein the filling material is a granulate material.

FIGS. 1 and 2 illustrate a vessel 10 having a first end 12 and a second end 14. In the embodiment shown, the vessel 10 includes a hollow main body 16. It is understood that the vessel 10 can be any vessel type as desired such as a metal vessel, a vessel including a metal main body having an outer composite shell disposed thereon, a vessel including a plastic main body having an outer composite shell disposed thereon, and a vessel produced from a composite material, for example. The vessel 10 has a substantially cylindrical shape and is adapted to hold a pressurized fluid (not shown). It is understood that the vessel 10 may have any shape as desired, and the vessel 10 may include additional layers such as a barrier layer, a foil layer, a porous permeation layer, and the like, as desired. The pressurized fluid may be any fluid such as a gas (e.g. hydrogen gas and oxygen gas), a liquid, and both a liquid and a gas, for example. As shown, the main body 16 is formed from a moldable material such as polyethylene, polypropylene, polyethylene terephthalate (PET), ethylene vinyl alcohol, and a polyamide, for example. It is understood that the main body 16 can be formed from any material as desired such as a metal material and formed by any conventional forming process as desired such a welding process, a rotational molding process, an injection blow molding process, and any combination thereof, for example.

At least one neck finish 20 forms an opening into an interior 22 of the main body 16. In the embodiment shown, the finish 20 is formed in the main body 16 at the first end 12 and the second end 14 of the vessel 10. Additional or fewer neck finishes 20 can be formed in the main body 16 as desired. The neck finish 20 receives a vessel penetration element (not shown) therein such as a fitting, a valve, a sensor, a component of a divided boss, a hose, a nozzle, a conduit, and the like, for example. As shown, an inner surface 24 of the neck finish 20 is threaded and receives a seal 26 thereon.

The interior 22 of the main body 16 includes a filling material 28 disposed therein. As shown in FIG. 1, the filling material 28 can be a porous structured material such as a foam material (i.e. a metal foam, a polymer foam, a carbon foam, and the like, for example), a ceramic material, and any combination thereof, for example. The filling material 28 can also be a granulate material, as shown in FIG. 2, such as a microporous granulate (i.e. a plurality of microporous beads, for example), for example. The filling material 28 can also be any combination of the porous structured material and the granulate material as desired. It is understood that the filling material 28 can have any porosity as desired. It is further understood that the filling material 28 can have any surface treatment as desired such as a coating, for example.

As shown, the filling material 28 fills substantially the entire interior 22 of the main body 16. It is understood, however, that the filling material 28 may be disposed in a portion of the interior 22 of the main body 16 as desired. The filling material 28 minimizes an energy released from the vessel 10 during a sudden release of pressure from the vessel 10, and minimizes a rate of flow of the fluid from the main body 16 of the vessel 10. For example, when an undesired opening is formed in a high pressure vessel, typically, a region surrounding the opening is subjected to a high stress concentration because a fluid disposed in the vessel is pressurized and a rate of flow of the fluid through the opening is maximized. As a result, fractures propagate from the opening resulting in fragmentation of the main body of the vessel.

When an undesired opening is formed in the vessel 10, however, the filling material 28 minimizes the stress concentration subjected to the opening by minimizing the rate of flow of the fluid through the opening. Further, the filing material 28 absorbs energy produced by an expansion wave facilitated by formation of the undesired opening in the vessel. Particularly, energy is absorbed by an outer portion of the filing material 28 and absorption continues inwardly until complete conversion or destruction of the filling material 28 has occurred. For example, a metal foam material plastifies at an outer portion thereof and continues to inwardly plastify until complete plastification of the metal foam material has occurred. A conversion of the filling material 28 must occur before fragmentation of the vessel 10 can occur. Additionally, the converted or destroyed filling material 28 minimizes the rate of flow of the fluid from the main body 16. Accordingly, the filling material 28 militates against significant fragmentation of the vessel 10 during the sudden release of pressure therefrom. Additionally, the converted or destroyed filling material 28 dissipates energy produced as a result of the sudden release of pressure from the vessel 10. For example, energy is required to accelerate the converted or destroyed filling material 28.

In the embodiment shown, an outer shell 30 is formed around at least a portion of the main body 16. A portion of the outer shell 30 is disposed on the at least one neck finish 20. The outer shell 30 is typically formed by a filament winding and curing process. When the outer shell 30 is formed by the filament winding and curing process, the outer shell 30 may be formed from a carbon fiber, a glass fiber, a composite fiber, and a fiber having a resin coating, for example. It is understood that the outer shell 30 can be formed by other methods as desired.

To form the vessel 10, the main body 16 is formed by any conventional forming process. After the main body 16 has been formed, the filling material 28 is disposed in at least a portion of the hollow interior 22 by any convention method as desired. Alternatively, the main body 16 may be formed around the filling material 28 as desired. Optionally, the outer shell 30 is then formed around at least a portion of the main body 16 using the filament winding and curing process. Once the outer shell 30 is cured, the vessel 10 is complete. The main body 16 of the vessel 10 is then filled with the pressurized fluid.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A vessel comprising:
    a main body defining a hollow interior for receiving a fluid therein; and
    a filling material disposed in the hollow interior of the main body, wherein the filling material completely plastifies before a fragmentation of the main body to minimize a rate of flow of the fluid from the main body by dissipating energy produced as a result of a sudden release of pressure from the vessel, and wherein the filling material is not bonded.
2. The vessel according to claim 1, wherein the filling material is disposed in at least a portion of the hollow interior of the main body.
3. The vessel according to claim 1, wherein the filling material is at least one of a porous structured material and a granulate material.
4. The vessel according to claim 1, wherein the filling material is at least one of a porous foam material, a sponge material, and a ceramic material.
5. The vessel according to claim 1, wherein the filling material is at least one of a metal foam, a carbon foam, and a polymer foam.
6. The vessel according to claim 1, wherein the filling material is a microporous granulate.
7. The vessel according to claim 1, wherein the filling material minimizes the rate of flow of the fluid through an undesired opening formed in the main body.
8. A vessel comprising:
    a main body defining a hollow interior for receiving a pressurized fluid therein, the main body having at least one neck finish formed therein to form an opening into the hollow interior of the main body;
    a filling material disposed in the hollow interior of the main body, wherein the filling material completely plastifies before a fragmentation of the main body to minimize a rate of flow of the fluid from the main body by dissipating energy produced as a result of a sudden release of pressure from the vessel, and wherein the filling material is not bonded; and
    an outer shell formed around the main body, wherein the outer shell is formed by a fiber material.
9. The vessel according to claim 8, wherein the filling material is disposed in at least a portion of the hollow interior of the main body.
10. The vessel according to claim 8, wherein the filling material is at least one of a porous structured material and a granulate material.
11. The vessel according to claim 8, wherein the filling material is at least one of a porous foam material, a sponge material, and a ceramic material.
12. The vessel according to claim 8, wherein the filling material is at least one of a metal foam, a carbon foam, and a polymer foam.
13. The vessel according to claim 8, wherein the filling material is a microporous granulate.
14. The vessel according to claim 8, wherein the filling material minimizes the rate of flow of the pressurized fluid through an undesired opening formed in at least one of the main body and the outer shell.
15. A vessel comprising:
    a main body defining a hollow interior for receiving a pressurized fluid therein, the main body having at least one neck finish formed therein to form an opening into the hollow interior of the main body, wherein the at least one neck finish receives a vessel penetration element therein;
    an outer shell formed around the main body; and
    a filling material disposed in at least a portion of the hollow interior of the main body, wherein the filling material completely plastifies before a fragmentation of the main body to minimize a rate of flow of the pressurized fluid by dissipating energy produced as a result of a sudden release of pressure from the main body through an undesired opening formed in at least one of the main body and the outer shell, and wherein the filling material is not bonded.

16. The vessel according to claim 15, wherein the filling material is at least one of a porous structured material and a granulate material.

17. The vessel according to claim 15, wherein the filling material is at least one of a porous foam material, a sponge material, and a ceramic material.

18. The vessel according to claim 15, wherein the filling material is at least one of a metal foam, a carbon foam, and a polymer foam.

19. The vessel according to claim 15, wherein the filling material is a microporous granulate.

20. The vessel according to claim 15, wherein the filling material is a plurality of microporous beads.

* * * * *